United States Patent [19]
Fleck et al.

[11] Patent Number: 5,956,921
[45] Date of Patent: Sep. 28, 1999

[54] METHOD FOR PREPARING FLOORING SYSTEM HAVING CRACK SUPPRESSION AND FRACTURE RESISTANCE

[75] Inventors: Henry W. Fleck, Kansasville; Robert J. Galganski, Brookfield, both of Wis.

[73] Assignee: Badger Cork & Manufacturing Co., Trevor, Wis.

[21] Appl. No.: 09/094,521

[22] Filed: Jun. 15, 1998

Related U.S. Application Data

[62] Division of application No. 08/635,299, Apr. 19, 1996, Pat. No. 5,766,754.

[51] Int. Cl.$^6$ .................................................... E04G 21/00
[52] U.S. Cl. ...................... 52/741.3; 52/741.4; 52/746.1; 52/514; 428/323
[58] Field of Search .................................... 428/323, 326, 428/327, 332, 338, 339, 455; 52/390, 309.13, 514.5, 514, 741.4, 741.3, 746.1; 156/71

[56] References Cited

U.S. PATENT DOCUMENTS 5,255,482  10/1993  Whitacre .................... 52/390

OTHER PUBLICATIONS

English language translation of French Patent 1 583 895 issued to Bestmann.

*Primary Examiner*—Marion McCamish
*Assistant Examiner*—Cheryl Juska
*Attorney, Agent, or Firm*—Foley & Lardner

[57] ABSTRACT

A system is provided for inhibiting or suppressing the transmission and propagation of cracks between a supporting substrate and a finishing layer. The system is applicable for floorings, walls, counters and other surfaces where a relatively fragile finishing surface, such as tile, marble or natural stone disposed on a base material, such as concrete. The system includes a first adhesive layer disposed on the substrate, an isolating layer of a rubber and cork composite material disposed on the first adhesive layer, a second adhesive layer disposed over the isolating layer, and the finishing layer applied over the second adhesive layer. The isolating layer is preferably approximately 1.2 millimeters in thickness. The system inhibits or suppresses the transmission and propagation of cracks, fissures and the like that may develop over time from the substrate layer to the finishing layer.

6 Claims, 1 Drawing Sheet

METHOD FOR PREPARING FLOORING SYSTEM HAVING CRACK SUPPRESSION AND FRACTURE RESISTANCE

CROSS-REFERENCES TO RELATED APPLICATIONS, IF ANY

This application is a division of U.S. Ser. No. 08/635,299 filed on Apr. 19, 1996, now U.S. Pat. No. 5,766,754 issued Jun. 16, 1998.

BACKGROUND OF THE INVENTION

FIELD OF THE INVENTION

The present invention relates generally to a system for inhibiting or limiting the transfer and propagation of cracks from foundational materials or substrates, such as subflooring, to finish layers disposed thereon, such as tile, stone and other relatively brittle materials. In particular, the invention relates to an innovative system incorporating a composite material disposed between the substrate and the finish layers to absorb or dissipate movement in the substrate due, for example, to cracking, fissuring and the like.

A number of surface finishing techniques are known for covering floors, walls, counters and the like. One such technique involves securing tile, stone panels or sheets and the like to the support surface or substrate via a cement or glue. In the case of flooring, such surface finishing materials are generally cemented to a subfloor or foundation layer such as concrete. The subfloor may be a slab disposed directly on the ground, or may consist of a single or multiple sections supported on a superstructure creating elevated floor levels, such as in a multistory structure.

Where tiles, stone and similar materials are applied to concrete and similar substrates, a problem exists when the substrate undergoes movement, cracks or fissures beneath the overlying material. This problem is exacerbated by the generally brittle nature of many finishing materials, such as tiles and stone. Where such materials are cemented or glued directly to the substrate, cracks in the underlying layers tend to be transmitted to the finishing materials, resulting visible cracks. In the case of sectional finishing materials, such as ceramic tile, such cracks may occur both between tiles and through individual tiles. Over time, such cracking can substantially mar the appearance of the finished surface and deteriorate the surface, particularly surrounding the broken or fractured areas.

Techniques have been developed in an attempt to prevent, or at least to inhibit, the propagation of cracks from a structural substrate to an overlying finishing material. In one such technique, a non-woven fabric sheet is laid over and secured to the substrate and the finishing material is secured to the fabric. In a similar technique, a polymer membrane layer is disposed over the substrate and the finishing material secured to the membrane. A serious drawback of both of these known techniques is the relatively high cost of the intermediate sheet or membrane, which significantly increases the cost of the overall finishing operation. Moreover, certain formulations of the intermediate sheets or membranes do not provide the resiliency desirable for suppression or inhibition of crack transmission to the finishing material.

Other, generally similar, techniques have been proposed for interposing various materials between a subfloor and a finishing material, such as tile or stone, to absorb or dissipate sound. In one such technique, a relatively thick layer of composition cork, typically 6 millimeters thick, is interposed between the substrate and the finishing material. The material aids in deadening sound through the flooring, but typically only provides limited capability for suppressing crack transmission between the subfloor and finishing layer. Moreover, like the non-woven and polymer membrane materials, the composition cork material can add unnecessarily to the cost of the finishing operation, particularly where sound deadening is less an issue than crack inhibition.

There is a need, therefore, for an improved technique for isolating a finishing layer, such as a relatively brittle floor covering, from a structural substrate so as to prevent or inhibit transmission of cracks and fissures from the substrate to the finishing layer. In particular, there is a need for such a technique that makes use of an isolation material that is less expensive than known materials, but that is sufficiently resilient to isolate the substrate from the finishing layer. In addition, the technique should be relatively easy and rapid, so as to permit the finishing operation to be carried out in a timely manner by artisans already familiar with the basic finishing technique.

SUMMARY OF THE INVENTION

The present invention features a novel crack inhibiting technique designed to respond to these needs. The technique is applicable for preventing or inhibiting crack transmission and propagation in a variety of environments, including ground and elevated floors, counters, walls, and the like. The technique calls for the use of a composite material as an intermediate layer between the substrate and the finishing layer. The composite material preferably includes cork and rubber granules joined by a binder to form a self supporting sheet that can be conveniently rolled for storage and transport. The sheet is preferably approximately 3/64 inches (1.2 millimeters) thick and is cemented or otherwise secured directly to the substrate to form a very thin insolation layer. The finishing layer is then cemented or otherwise secured to the composite material. The combination of rubber and cork with a binder in the intermediate layer provides a crack suppression layer that is both resilient and affordable, and that can be readily applied to both large and small areas to be finished by artisans familiar with conventional finishing techniques.

Thus, in accordance with one aspect of the invention, a crack inhibiting system is provided for inhibiting cracks in a floor covering finishing material. The system includes a substrate material layer, first and second adhesive layers, an isolating layer and the finishing material layer. The substrate material layer has a face to be finished and the first adhesive layer is disposed over the face of the substrate material layer. The isolating layer is disposed over the first adhesive layer and adhered to it. The isolating layer comprises a composite material including cork and rubber granules retained by a binder. The second adhesive layer disposed over the isolating layer and adhered to it, and the finishing material layer is disposed over and adhered to the second adhesive layer. The isolating layer inhibits transmission of cracks, fissures, breaks and the like from the substrate material layer to the finishing material layer.

In accordance with another aspect of the invention, a method is provided for inhibiting the transmission and propagation of cracks, fissures and the like from a subfloor to a finishing material disposed thereon. The method includes the steps of disposing a first adhesive layer over the subfloor and adhering an isolating layer over the first adhesive layer. The isolating layer comprises a composite material of cork and rubber retained by a binder. A second adhesive layer is then disposed over the isolating layer and the finishing material is adhered over the second adhesive layer.

In accordance with still another aspect of the invention, a method is provided for inhibiting the transmission and propagation of cracks, fissures and the like from a supporting substrate material to a finishing material disposed thereon. The method includes the steps of disposing a first adhesive layer over the substrate material and adhering an isolating layer over the first adhesive layer. The isolating layer includes cork particles and rubber particles bound together to form a flexible, self supporting sheet. The sheet can be handled in roll form such that the isolating layer may be easily spread over the first adhesive layer and securely attached to it. The material may be easily cut to conform to walls bordering the area to be finished as well as objects or features within the area, such as pillars, electrical outlets, piping and the like. A second adhesive layer is then disposed over the isolating layer and the finishing material is adhered over the second adhesive layer.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
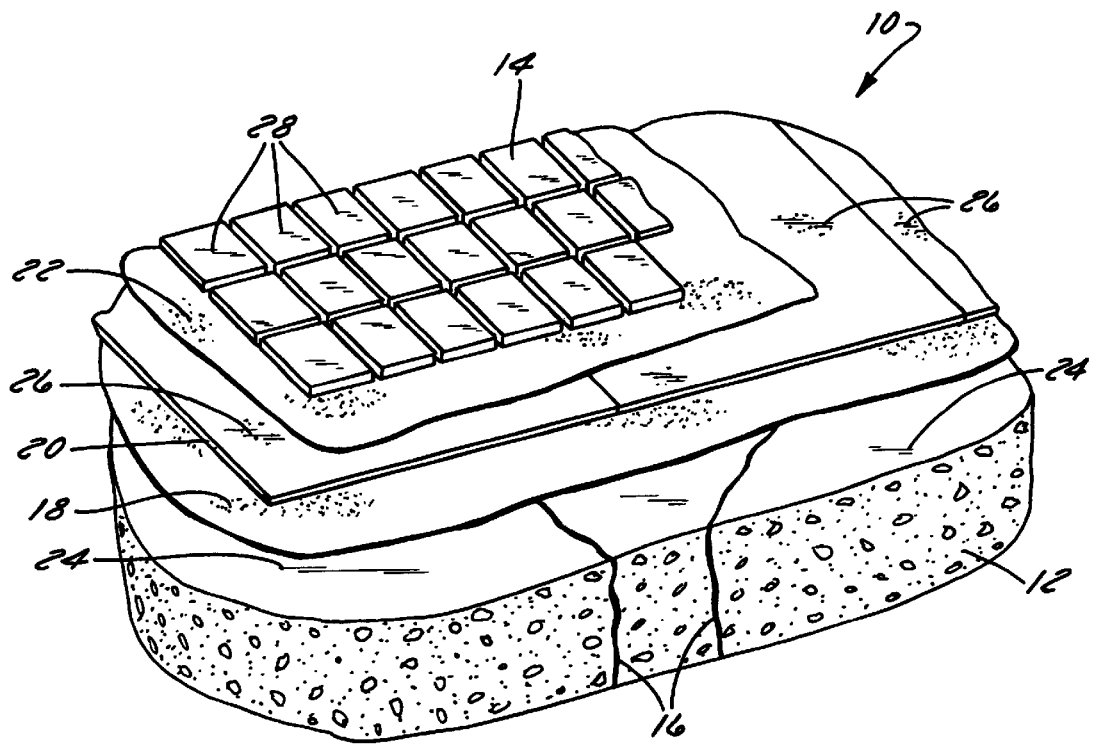
FIG. 1 is a perspective view of a floor on which layers of finishing materials have been laid, the various layers being illustrated only partially to show the manner in which they are successively applied to the subfloor or substrate.
Figure 2:
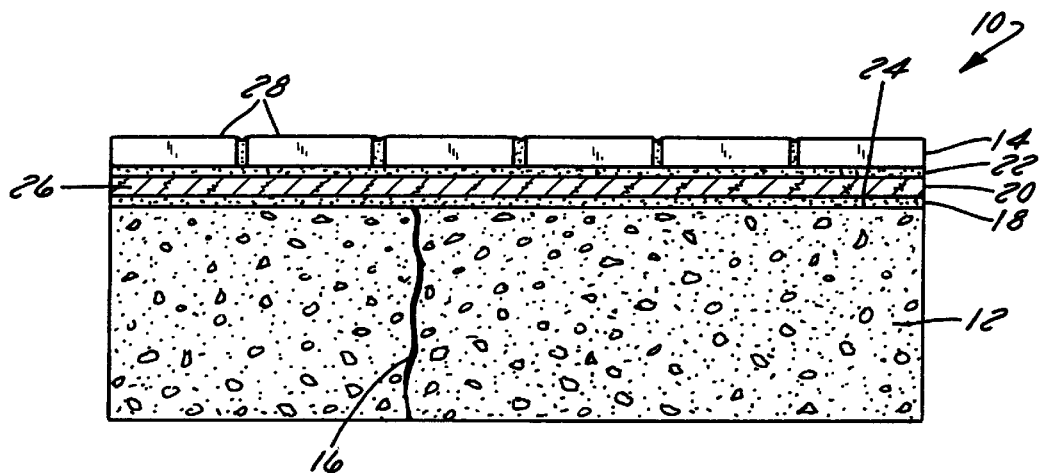
FIG. 2 is a sectional view through a finished floor of the type shown in FIG. 1, illustrating the successive layers of material, including the intermediate composite crack inhibiting material interposed between the substrate and the exposed finishing layer.

Turning now to the drawings and referring to FIG. 1, a system, designated generally by the reference number 10, is illustrated for preventing the transmission and propagation of cracks, fissures and the like from a structural substrate 12 to a finishing material surface 14. In the embodiment illustrated, substrate 12 is a concrete slab, which may be laid directly on the ground or supported on a superstructure, such as to form an elevated floor in a multistory structure, in a manner well known in the art. More generally, however, substrate 12 consist of any of a variety of materials, such as prestressed concrete, stone, or any other material which is susceptible to movement or cracking over its useful life and which is to be covered by a finishing material 14. Moreover, it should be understood that, while substrate 12 is illustrated as a horizontal slab, in general the present system could be applied to structural substrates having other orientations, including sloped floors, vertical walls, inclined ramps and the like.

System 10 includes intermediate layers of material interposed between substrate 12 and finishing layer 14 designed to isolate finishing layer 14 from substrate 12 and to inhibit the transmission and propagation of cracks 16 from substrate 12 to finishing layer 14. As illustrated, these intermediate layers include a first adhesive layer 18, an isolating layer 20 and a second adhesive layer 22. First adhesive layer 18 is preferably either a high grade Type I organic adhesive conforming to ANSI A118.4 standard or latex-Portland cement mortar conforming to ANSI A108.5 standard. First adhesive layer 18 is disposed directly over the surface 24 of substrate 12 to be finished, as described below and serves to bond isolating layer 20 to substrate 12. Second adhesive layer 22 is preferably latex-Portland cement mortar conforming to ANSI A108.5 standard and is similarly disposed directly between isolating layer 20 and finishing layer 14 and bonds these two layers to one another.

Isolating layer 20 is an underlayment material that is disposed over and adhered to layer 18 throughout the area to be covered by finishing material layer 14. Isolating layer 20 consists of a cork and rubber composite material preferably preformed into continuous rolls of self-supporting sheet. In the presently preferred embodiment, layer 20 includes cork and cork rubber granules within a size range of from 10 to 60 mesh. The relative percentages of cork and cork rubber by weight preferably fall within ranges of from 10 to 20 percent cork and from 50 to 80 percent cork rubber. The rubber component of layer 20 may be recycled particles of vulcanized rubber. The cork and rubber particles are preferably retained in layer 20 by a binder such as a polyurethane resin binder in an amount of from 10 to 20 percent by weight. The cork, rubber and binder components are preferably combined and processed to form a uniform roll sheet approximately 1.2 millimeters in thickness and trimmed to a convenient width, such as 4 feet. Moreover, layer 20 preferably has a density of between 35 and 45 pounds per cubic foot. Material of the type preferred for isolating layer 20 is commercially available from Badger Cork and Manufacturing Company of Trevor, Wis. under the commercial designation StressCORK.

Crack inhibiting system 10 is preferably installed as follows. Prior to applying first adhesive layer 18, any open cracks or the like in substrate 12 should be filled with a high grade epoxy filler. Substrate 12 should then be inspected to ensure that its surface 24 is generally dry and free of dirt and dust. Layer 20 is preferably laid loose over surface 24 of substrate 12 by successively unrolling, precutting and trimming adjacent sections 26 of composite material to form a uniform layer covering the entire surface of substrate 12. The loose sheets of composite material are then removed and adhesive layer 18 applied by generally known techniques, such as by means of a V-notched trowel or spatula. Adhesive layer 18 is generally uniformly spread over surface 24 and preferably contains sufficient adhesive to produce a finished layer approximately 3 millimeters (⅛ inch) thick after application of the subsequent layers as described below. Isolating layer 20 is then replaced over adhesive layer 18 and evenly rolled, such as with a 50 pound roller bidirectionally to eliminate any air bubbles from adhesive layer 18 and to provide uniform adhesion of isolating layer 20.

Following completion of isolating layer 20, second adhesive layer 22, which may be identical to first adhesive layer 18 is disposed over isolating layer 20. Finishing layer 14 is then laid over and adhered to layer 22 in a conventional manner. Where finishing layer 14 includes ceramic tile, stone or the like, the individual tiles 28 may be laid and spaced separately or in prefabricated sections, and grout or cement applied between adjacent tiles. Adhesive layers 18 and 22 are then allowed to cure along with any grouting provided between tiles 28.

It has been found that system 10, including isolating layer 20 as described above effectively inhibits of cracks and fissures that develop in substrate 12 from being transmitted to and propagating in finishing layer 14. In particular, system 10 has been shown to meet criteria for residential performance for bridging a separation in a concrete slab as simulated in field cracking conditions of a minimum of 0.030 inches, in accordance with ASTM C627 (modified) split slab test. Moreover, isolating layer 20 has been shown to provide an adhesion bond shear strength exceeding 50 pounds per square inch, in accordance with ASTM C482 (modified).

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method for inhibiting cracking in a flooring system including a substrate material layer and finishing material disposed thereover comprising the steps of:
   a) applying a first adhesive layer over the substrate material layer;
   b) applying over and adhering to the first adhesive layer an isolating layer the isolating layer comprising at least 80 percent by weight of a mixture of cork and rubber particles retained by at least 10 percent by weight of a binder, the particles being 10 mesh or smaller;
   c) applying and adhering over the isolating layer a second adhesive layer; and
   d) applying over and adhering to the second adhesive layer a finishing material layer, whereby the isolating layer inhibits transmission of cracks, fissures or breaks from the substrate material layer to the finishing material layer.

2. The method of claim 1 wherein the isolating layer is applied at a thickness of approximately 1.2 millimeters.

3. The method of claim 1 wherein the first adhesive layer is a latex-Portland cement mortar.

4. The method of claim 1 wherein the binder is a polyurethane binder.

5. The method of claim 1 wherein the cork particles are within a size range of 10 to 60 mesh, and the rubber particles are within a size range of 10 to 60 mesh, in relative amounts of from 10 to 20 percent cork by weight and 50 to 80 percent rubber by weight.

6. The method of claim 1 wherein the particles include 10 to 20 percent cork by weight and 50 to 80 percent rubber by weight.

* * * * *